V. C. PALMER, H. JOSEPH & J. F. SULLIVAN.
SWEEP RAKE APPROACH.
APPLICATION FILED JUNE 6, 1910.
982,386.
Patented Jan. 24, 1911.
2 SHEETS—SHEET 1.
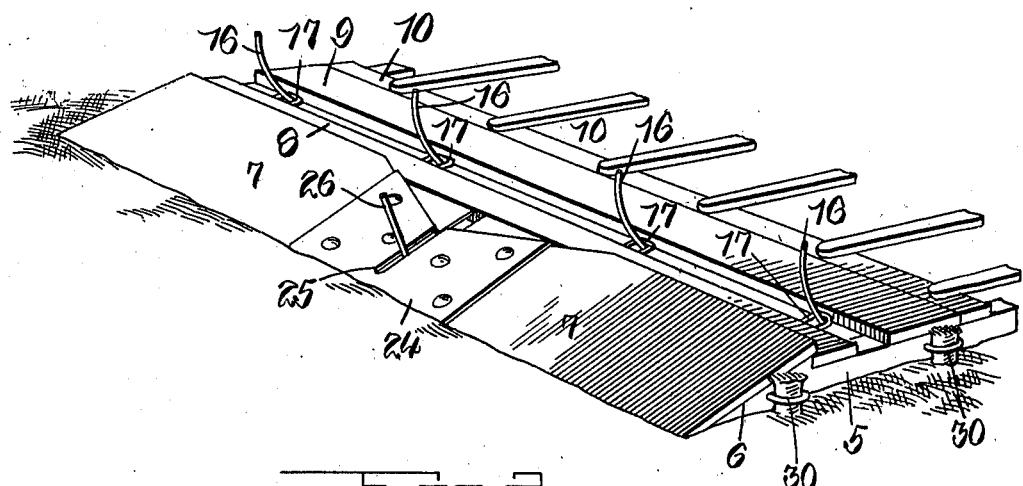
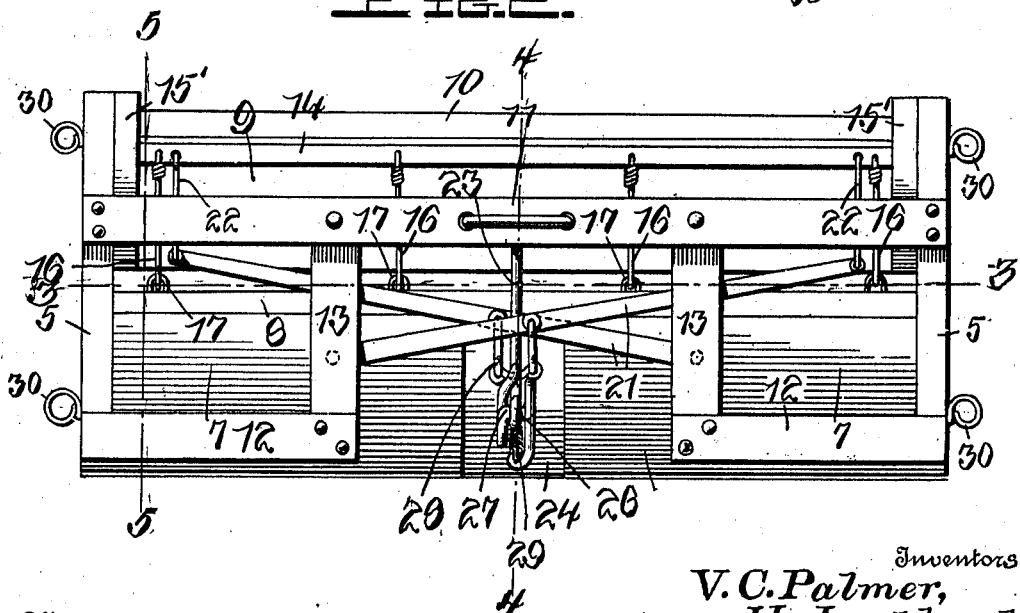
Witnesses
Chas. L. Griesbauer
E. M. Ricketts
Inventors
V. C. Palmer,
H. Joseph, and
J. F. Sullivan,
By Watson E. Coleman,
Attorney V. C. PALMER, H. JOSEPH & J. F. SULLIVAN.
SWEEP RAKE APPROACH.
APPLICATION FILED JUNE 6, 1910.
982,386.
Patented Jan. 24, 1911.
2 SHEETS—SHEET 2.
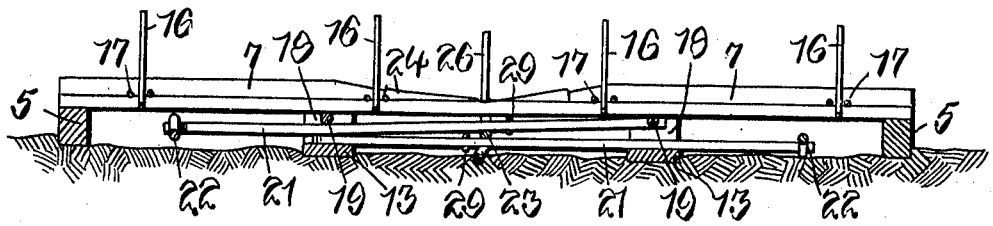
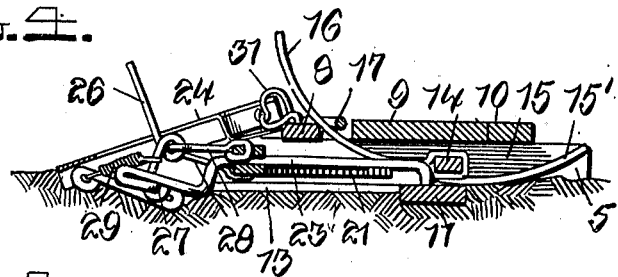
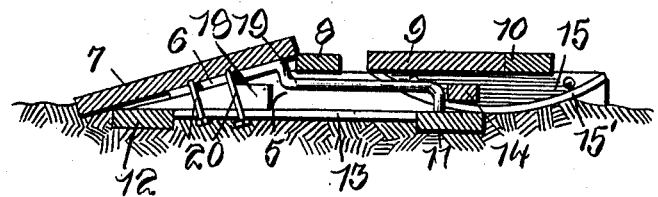
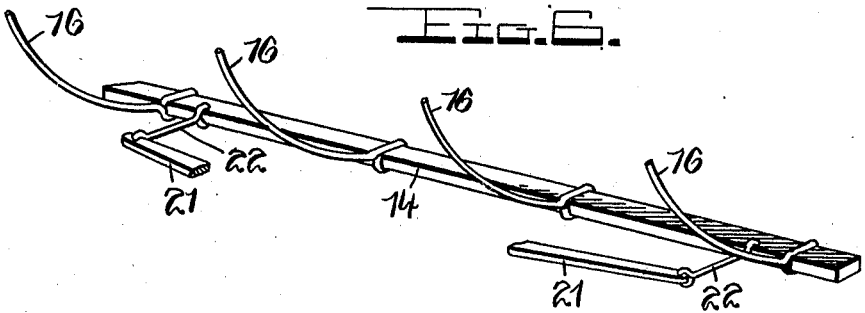
Witnesses
Chas. L. Griesbauer.
E. M. Ricketts
Inventors
V. C. Palmer,
H. Joseph, and
J. F. Sullivan,
By Watson E. Coleman.
Attorney
THE NORRIS PETERS CO., WASHINGTON, D. C.

UNITED STATES PATENT OFFICE.

VICTOR C. PALMER, HORACE JOSEPH, AND JAMES F. SULLIVAN, OF NORWOOD, COLORADO.

SWEEP-RAKE APPROACH.

982,386.

Specification of Letters Patent.

Patented Jan. 24, 1911.

Application filed June 6, 1910. Serial No. 565,266.

*To all whom it may concern:*

Be it known that we, VICTOR C. PALMER, HORACE JOSEPH, and JAMES F. SULLIVAN, citizens of the United States, residing at Norwood, in the county of San Miguel and State of Colorado, have invented certain new and useful Improvements in Sweep-Rake Approach, of which the following is a specification, reference being had to the accompanying drawings.

This invention relates to an improved sweep rake approach and has for its object to provide a comparatively simple device of this character adapted to be actuated by the teeth of the rake to facilitate the loading of hay.

A further object is to provide a bar carrying a plurality of curved tines and means actuated by the rake to move said bar and extend the tines into engagement with the hay to direct the same upon the teeth of the stacker.

A still further object is to provide a device which is of very simple and inexpensive construction and which is adapted to be arranged in the ground and actuated by the movement of the sweep rake teeth as the same moves forward and back across the device after delivering the hay upon the stacker teeth.

With these and other objects in view, the invention consists of the novel features of construction, combination and arrangement of parts hereinafter fully described and claimed, and illustrated in the accompanying drawings, in which—

Figure 1 is a perspective view showing the general arrangement of the device when in use; Fig. 2 is a bottom plan view; Fig. 3 is a section taken on the line 3—3 of Fig. 2; Fig. 4 is a section taken on the line 4—4 of Fig. 2; Fig. 5 is a section taken on the line 5—5 of Fig. 2; and Fig. 6 is a detail perspective view of the movable bar, a portion of the actuating levers being shown connected thereto.

Referring more particularly to the drawings 5 indicates the end bars of a frame in which the operating mechanism of the device is arranged. The forward ends of these bars are beveled or inclined as shown at 6 and to these inclined ends the connecting members 7 are secured, said members having their inner ends spaced. A bar 8 is also secured to the end members 5 adjacent to the rear longitudinal edge of the members 7. Connecting bars 9 and 10 are also secured to the end bars 5 and upon these latter connecting bars the hay is adapted to be delivered by the sweep rake to be taken up by the teeth of the loader. Secured to the under sides of the end bars 5 beneath the bar 9 is a strip 11 which is connected to the short longitudinal strips 12 which extend inwardly from the forward ends of the bars 5 by means of the connecting strips 13. The parts above described form a very rigid and substantial frame structure by which the operating mechanism is carried. This operating mechanism comprises a longitudinally disposed bar 14 which is arranged between the bar 9 and the bar 11. Guides 15 are secured to the end bars 5. These guides are in the form of short arcuate plates which are provided with the inwardly disposed transverse flanges 15' upon which the ends of the bar 14 are supported and move. To the bar 14 a plurality of curved tines 16 are secured. These tines extend forwardly through suitable guides 17 which are secured to the bar 8. Between the forward ends of the connecting strips 13 and the inclined members 7, blocks 18 are disposed. The under sides of the members 7 are grooved to receive the rods 19, said rods being bent between their ends and extending through the rear ends of the strips 13 and rest on the connecting bar 11. The forward ends of these rods are secured to the blocks 18 by means of the bolts 20 which extend through the strips 13 and through the blocks and have their upper ends formed into hooks which engage over said rods. These rods 19 provide an additional brace and support for the inclined members 7.

The bar 14 is adapted to be automatically moved laterally in the guides 15 by means of the levers 21. One end of each of the levers is connected to said bar by means of a short rod 22, said levers extending inwardly and having their other ends crossed and pivoted to the blocks 18. A rod 23 is rigidly secured at one end to the connecting bar 11 and extends forwardly beneath and between the inclined members 7. The spaced ends of these members are connected by a sheet metal plate 24 which is provided with a central longitudinal slot 25 to accommodate an actuating lever 26. The forward end of the bar 23 is bent upon itself to form a bearing as at 27. Upon this bearing the actuating lever 26 is pivotally mounted at its lower end. A U-shaped link is disposed in an eye formed in the operating lever immediately below the plate 24 and to the ends of this link the rods 28 are connected, said rods extending from the pivoted actuating levers 21. A coiled spring 29 is secured at one end to the lever 26 and at its other end to the rod 23. This spring normally tends to draw the lever forwardly and force the same upwardly above the plane of the metal plate 24.

In the operation of our invention, a shallow excavation is first made in the ground so that the end bars 5 will set slightly below the level thereof. These end bars are provided with staples 30 through which anchoring pegs are adapted to be driven whereby any accidental movement of the device is prevented. The teeth of the loading rack are adapted to be disposed upon the rear bar 10, the inclined members 7 being disposed outwardly or away from the loader. As the sweep rake approaches the inclined members 7, the teeth thereof engage with the upwardly projecting lever 26 and force the same forwardly in the slot 25. This movement of the lever moves the bar 14 laterally and rearwardly through the pivotal movement of the levers 21 which are connected to the lever 26. This rearward movement of the bar 14 draws the tines 16 downwardly in the guides 17 below the rear edge or highest point of the inclined members 7. Thus the rake teeth may move over the tines to discharge the hay carried thereby upon the teeth of the loading rack and the bar 9. Upon the reverse or return movement of the sweep rake, the engagement of the teeth thereof with the lever 26 will move the same forwardly whereby similar movement may be imparted to the pivoted levers 21 and the bar 14, thus extending the tines 16 upwardly above the frame and preventing the displacement of the hay which has been deposited upon the connecting member 9, holding the same in position until it is gathered by the teeth of the loading rack.

In the event that a hay sling is employed instead of the usual rack, we provide a hook 31 secured to the connecting bars 8 and formed in two pivoted sections. This hook is adapted to receive a ring carried by the hay sling and after a sufficient quantity of hay has been disposed therein and bound, the pivoted section of the hook 31 may be lifted to release the ring therefrom.

From the foregoing it is believed that the construction and operation of our improved sweep rake approach may be readily understood. The device is extremely simple in construction and may be manufactured at a comparatively low cost. By its use the loading of hay or straw is materially facilitated and the same kept in position to be elevated by the hay rack when the sweep rake is withdrawn.

While we have shown and described a particular embodiment of our invention which we deem to be the preferable one at the present time, it will be understood that the particular arrangement of parts above set forth is capable of considerable modification without departing from the essential feature or sacrificing any of the advantages of our invention.

Having thus described the invention what is claimed is:—

1. A device of the character described comprising a frame, a laterally movable bar supported in said frame, a plurality of tines secured to the bar and extending above the frame, and means adapted to be actuated by the movement of a rake over the frame to move said bar and raise and lower the tines, substantially as and for the purpose set forth.

2. A device of the character described comprising a frame, a laterally movable bar carried by said frame, guides for the bar, a plurality of tines secured to said bar and normally extending above the frame, and means for actuating said bar to move said tines below the surface of the frame, substantially as and for the purpose set forth.

3. A device of the character described comprising a frame consisting of end members and a plurality of connecting members secured thereto, inclined members secured to the forward ends of said end members and extending inwardly therefrom, the inner ends of said inclined members being spaced, a bar laterally movable between said end members, said bar carrying a plurality of tines normally disposed between said connecting members and the inclined members and extending above the same, a lever projecting between the inner ends of the inclined members, and operating connections between said lever and said bar adapted to move said bar to dispose said tines below the frame, substantially as and for the purpose set forth.

4. A device of the character described comprising a frame consisting of spaced end members and a plurality of bars connecting the same, the forward ends of said members having their upper edges inclined, inwardly extending inclined members secured to said end members and having their inner ends spaced, a plate connecting said members, a bar movably arranged between and supported upon the end members, a plurality of curved tines movable with said bar, guides arranged on one of the bars connecting said end members, said tines being movable therethrough, a lever extending between said inclined members and above the same, a spring yieldingly holding said levers against movement and normally positioning the tines above the frame, an operating connection between said levers and the bar carrying said tines, substantially as and for the purpose set forth.

5. A device of the character described comprising a frame, a plurality of tines movably arranged in said frame and normally extending above the same, a lever pivotally mounted in the frame, means adapted to be actuated by the lever for moving said tines to dispose the same below the frame, and means for returning said lever to its normal position, substantially as and for the purpose set forth.

6. A device of the character described comprising a movable series of tines, a spring held operating lever, and means actuated by the operation of said lever to move said tines, said lever being positioned for engagement by the teeth of a sweep rake to dispose the tines out of the path of the rake in one direction of its movement, substantially as and for the purpose set forth.

7. A device of the character described comprising a movable bar, a series of curved teeth carried by said bar, a vertically positioned operating lever, crossed pivoted levers connected to said bar, connections between the operating lever and the pivoted levers, and means yieldingly holding said lever against operation, substantially as and for the purpose set forth.

8. A device of the character described comprising a frame structure, a bar laterally movable therein, a series of tines carried by the bar, guides for said tines, a longitudinal rod secured to the frame, an operating lever pivoted at one end to said rod, crossed levers each pivoted at one of their ends and connected to said bar, connections between said crossed levers and the operating levers, and a spring connected to said rod and to the operating lever normally holding the lever yieldingly against operation, substantially as and for the purpose set forth.

9. A device of the character described comprising a frame consisting of end members and a plurality of bars connecting said members, transverse inclined members secured to the forward ends of said bars, said frame being adapted to be anchored to the ground, a bar disposed beneath said connecting bars, a plurality of curved tines carried by said bar normally extending above said frame, a longitudinal rod secured to the frame and extending beneath the transverse inclined members, an operating lever pivoted on said rod, crossed levers pivoted beneath said transverse members each connected at one of their ends to said bar, connections between said levers and the operating lever, a spring secured to said rod and to the operating lever, said lever extending above the transverse inclined members and adapted to be engaged and actuated by a sweep rake to move said bar laterally and dispose the tines carried thereby out of the path of movement of said rake, substantially as and for the purpose set forth.

In testimony whereof we hereunto affix our signatures in the presence of two witnesses.

VICTOR C. PALMER.
HORACE JOSEPH.
JAMES F. SULLIVAN.

Witnesses:
J. W. BANKSTON,
JOHN G. HAMPTON.